Patented Dec. 1, 1953

2,661,333

UNITED STATES PATENT OFFICE 2,661,333

METHOD FOR PURIFICATION OF WATER

Harry Leonard Schein, Stockholm, Sweden, assignor to Merkantila Ingeniörsbyrån Pehr Husberg Aktiebolag, Stockholm, Sweden, a corporation of the Kingdom of Sweden No Drawing. Application April 29, 1949, Serial No. 90,568

Claims priority, application Sweden July 2, 1948

1 Claim. (Cl. 210—28)

The invention relates to a process for the purification of the circulating water in swimming pools, and is characterized by superchlorination of the water up to an excess of actually free chlorine, i. e. "break-point" chlorination combined with magno-filtration.

As the terminology generally employed in connection with chlorination is still somewhat vague and frequently contradictory, in the present application the terms excess of bound chlorine and excess of free chlorine are understood to refer to such excesses of chlorine as defined analytically in Standard Methods for the Examination of Water and Sewage, 9th edition, New York 1946.

By research work mainly carried out in the U. S. A. (see B. Frisell, Modern Developments in Chlorination Technique, Vattenhygien No. 3, 1947, and bibliography) the chemistry of water purification has been extended by new points of view as to chlorination. On the addition of chlorine to the water and after meeting the immediate needs for chlorine in the water, there are formed, up to a certain limit for the added chlorine, substantially additive products between the chlorine and the oxidizable organic substances present in the water. In these chlorine compounds, which usually have a rather unpleasant odour and taste, the chlorine is relatively loosely bound and exercises a certain bactericidal effect; on examination in accordance with customary methods of analysis the added chlorine is freed by the hydrochloric acid and then reacts with for instance ortho-toluidine in the same way as really free chlorine, so that it was formerly regarded as such. If, however, the addition of chlorine is increased above the said limit which may be referred to as the "break-point" either a rearrangement of the chlorine to more stable compounds and/or a decomposition of the organic substances will occur and the directly observable result will be that the unpleasant odour and taste which are characteristic for certain organic chlorine compounds, will partially disappear. If the addition of chlorine is still further increased then actually free chlorine will occur in the water in direct proportion to the quantity of chlorine added.

It has thus become possible to control the superchlorination, that is to say, chlorination up to an excess of free chlorine, and at the same time, apart from obtaining a higher bactericidal effect, the oxidizing properties of the chlorine can be utilised for other purposes such as the improvement of the water's odour and taste, the removal of iron and manganese etc. A certain bleaching effect is also obtained which in the case of coagulation reduces the required quantity of chemicals, such as aluminium sulphate.

It is also known in the art to filtrate raw water through an alkaline filter material, such as magno material. This is a material made by partly burning dolomite at a temperature of from about 700° to 725° C.; see page 54 of the book entitled "Das Wasser in der Industrie and im Haushalt," by J. Leick, 3rd Edition, Verlag von Theodor Steinkopff, Dresden-Leipzig, 1942. The burning is conducted in a special manner so as to convert the more easily decomposible magnesium carbonate more or less into oxide and gaseous $CO_2$ but to permit the calcium carbonate to remain unchanged. In contact with natural waters the more active magnesium compounds will react first, only thereafter does the calcium carbonate react; see page 201 of the book entitled "Vom Wasser," Vol. 10, Verlag Chemie, G. m. b. H., Berlin 1935. Such magno-filtration has been employed for binding the aggressive carbonic acid to obtain equilibrium between lime and carbonic acid; that is to say, increasing the pH value of the water to a certain point to prevent corrosion in pipe-lines and the like. During such filtration the iron and manganese are also removed.

In applying the break-point chlorination described above, however, it has been found that certain difficulties are often encountered in practice. At a total oxidation of the organic chlorine compounds to obtain all excess of chlorine as a free chlorine excess it is true that the odour and taste characteristic for certain forms of bound chlorine excess will disappear. On the other hand the water frequently retains a marked chlorine odour which in this case is caused by "pure" chlorine. This odour is of a more aromatic character and is not directly unpleasant although it should be avoided in water for consumption and in circulating water for swimming pools, as it will cause irritations to the mucous membranes of the eyes and the like at the customarily employed pH values of 6.5–7.5.

It has also been found that it is frequently difficult in practice to adjust the addition of chlorine in such a way that the break-point is obtained exactly. Small temporary increases of for instance the organic substances in the water may, instead of providing a low excess of free chlorine, result in large quantities of bound excess of chlorine with the resulting unpleasant consequences. Then it is necessary to work with an adequate addition of chlorine to obtain a certain margin of the excess of free chlorine, but on the other hand such an excess of free chlorine will increase the disadvantages referred to above.

Furthermore an excess of free chlorine is often obtained after a relatively short contact period. In such case however, the relation between the free and the bound excess of chlorine has not been stabilised and appreciable quantities of bound chlorine excess may at the same time be present in the water with the unpleasant consequences this entails.

A further drawback which is eliminated by the invention is concerned not so much with the development of the break-point chlorination but relates more particularly to filtration through alkaline filter materials. If a water which is to be filtered through a filter material of this kind contains larger quantities of organic substances the surface of the filter material will gradually become inactive.

All the disadvantages referred to above are eliminated by the combined process according to the invention. After a relatively short contact period with free chlorine in excess, followed by alkaline filtration I observe a very notable reduction and in many cases a complete elimination of the above disturbing factors as regards odour and taste of the water and the surface activity of the filter material.

The reason for this phenomenon is dependent upon the fact that with a suitable filter material, particularly for soft surface water and circulating water for swimming pools, the excess of free chlorine which in natural water occurs substantially as hypochlorous acid is converted to the more stable hypochlorite ions and that the resulting pH increase has a favourable, that is a stabilizing effect on the organic chlorine compounds. It has also been found that a water treated in this manner, even when its original content of organic substances was relatively high, will not exercise an inactivating action on the filter material.

When magno filter material is selected it is thus possible to achieve the double object of protecting the pipelines against corrosion, for example, and at the same time converting the chlorine into such a form that the above-mentioned disturbing phenomena are eliminated in the customary chlorination of water.

Thus, in the case of raw water which is not contaminated or discoloured to a very high degree, the combination method of magno filtration and chlorination to an actual excess of chlorine can entirely replace the purification process previously employed such as coagulation with aluminum sulphate, for example, normal chlorination, sedimentation, filtration through rapid filters and adjustment of the pH value. Although this earlier method produces good water it requires the use of complicated and expensive plants which are furthermore difficult to operate.

This applies particularly to the circulating water in swimming pools which was formerly clarified by being caused to circulate through a plant similar to that which was used in purifying raw water. Here the water was chlorinated after coagulation (a chlorine dosage of about 0.2–0.6 mg./l was employed) and after sedimentation and rapid filtration the pH value was finally adjusted to 6.5–7.5 by the addition of soda or lime. This last-mentioned chemical dosage is frequently overlooked, however, or is carried out irregularly with the result that the mucous membranes of the bathers' eyes frequently become irritated. For the reasons mentioned above, moreover, a disturbing chlorine odour may easily arise at lower pH values notwithstanding the fact that chlorine dosage itself is so small that it is sometimes insufficient for sterilization in baths which are much used and have a long circulating time.

The method according to the invention calls for a larger addition of chlorine which naturally varies according to the amount of impurities, but usually lies within the limits 1–20 mg./l. At such circulating water, for instance, in order to ensure that the water is effectively sterilized and that the organic substances are entirely oxidized, it is now possible to utilise the advantages of the invention, in that it is no longer necessary to rely too much upon the position of the break-point since the latter may vary from time to time. Instead of it an adequate excess of free chlorine above the break-point is maintained, which according to the invention is possible without disadvantage if a suitable alkaline filter material is selected for the subsequent chlorination so that the excess of free chlorine is converted to hypochlorite and at the same time the pH value of the water is adjusted to 8–8.5 or even higher. Thus, by means of the method according to the invention the whole of the former treatment process is eliminated; the water is effectively purified and sterilised by the large excess of free chlorine the bactericidal effect of which is far superior to that of the excess of bound chlorine previously employed without the disadvantages being as great as is otherwise customary with smaller additions of chlorine.

I claim:

In the purification of the circulating waters in swimming pools, the process which consists in superchlorinating the water beyond the breakpoint to produce an excess of actually free chlorine and then passing the superchlorinated water through a filter bed of a dolomite, which has been partly burned substantially to decompose its magnesium carbonate content into magnesium oxide and $CO_2$ but to leave its calcium carbonate content substantially unchanged, thereby converting the said free chlorine into hypochlorite and raising the pH of the water up to at least about 8.

HARRY LEONARD SCHEIN.

References Cited in the file of this patent

UNITED STATES PATENTS

| Number | Name | Date |
|---|---|---|
| 1,211,481 | Noble | Jan. 9, 1917 |
| 1,324,118 | Hottinger | Dec. 9, 1919 |
| 1,413,153 | Baker | Apr. 18, 1922 |
| 1,750,561 | Adler et al. | Mar. 11, 1930 |
| 1,890,969 | Chaney | Dec. 13, 1932 |
| 2,272,223 | Pietzsch | Feb. 10, 1942 |
| 2,400,439 | Romans | May 14, 1946 |
| 2,452,928 | Hampel | Nov. 2, 1948 |

FOREIGN PATENTS

| Number | Country | Date |
|---|---|---|
| 19,722 | Great Britain | of 1914 |
| 10,705 | Great Britain | of 1915 |
| 286,338 | Great Britain | Mar. 5, 1928 |
| 292,099 | Great Britain | Oct. 4, 1928 |

OTHER REFERENCES

Chem. Absts. vol. 29, 1935, pp. 5208 and 6339.

Journal American Water Works Assn., vol. 31, 1939, pp. 2121–2129.

Water Works & Sewage, vol. 87, pp. 146–151, 1940.

Comprehensive Treatise on Inorganic and Theoretical Chemistry, Mellor, 1922, vol. 2, pp. 258 and 259.